(12) United States Patent
Dateki

(10) Patent No.: US 8,542,756 B2
(45) Date of Patent: Sep. 24, 2013

(54) COMMUNICATION METHOD, COMMUNICATION SYSTEM, TRANSMISSION DEVICE, AND RECEIVING DEVICE

(75) Inventor: Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/412,235

(22) Filed: Mar. 5, 2012

(65) Prior Publication Data

US 2012/0163482 A1 Jun. 28, 2012

Related U.S. Application Data

(63) Continuation of application No. PCT/JP2009/004691, filed on Sep. 17, 2009.

(51) Int. Cl.
*H04L 27/00* (2006.01)
*H04L 27/28* (2006.01)

(52) U.S. Cl.
USPC .......................................... 375/259; 375/260

(58) Field of Classification Search
USPC ................. 375/259, 260, 340; 370/328, 474; 714/748, 751
See application file for complete search history.

(56) References Cited

U.S. PATENT DOCUMENTS

| | | |
|---|---|---|
| 2003/0005387 A1 | 1/2003 | Tsunoda |
| 2007/0300134 A1 | 12/2007 | Sugai et al. |
| 2008/0175186 A1* | 7/2008 | Liu et al. .................. 370/320 |
| 2009/0033524 A1* | 2/2009 | Tiirola et al. ............... 341/51 |
| 2009/0059958 A1* | 3/2009 | Nakata ..................... 370/474 |

FOREIGN PATENT DOCUMENTS

| | | |
|---|---|---|
| JP | 09-116559 | 5/1997 |
| JP | 11-136220 | 5/1999 |
| JP | 2004-349891 | 12/2004 |
| WO | 03/028314 | 4/2003 |
| WO | 2006/061902 | 6/2006 |

OTHER PUBLICATIONS

International Search Report issued for corresponding international patent application No. PCT/JP2009/004691, mailed Dec. 1, 2009. English translation attached.

* cited by examiner

*Primary Examiner* — Khai Tran
(74) *Attorney, Agent, or Firm* — Myers Wolin, LLC

(57) ABSTRACT

A communication method of transmitting plural packets from a first communication device to a second communication device includes associating identification information items with combinations of reception results of the plural packets in the second communication device, specifying one of the identification information items based on the reception results of the plural packets in initial reception, and transmitting the one item to the first communication device; determining an encoding method and encoding the plural packets based on the determined encoding method, and retransmitting the encoded packets to the second communication device; and decoding the encoded packets based on successfully received packets and reproducing incorrectly received packets in the initial reception.

13 Claims, 8 Drawing Sheets

MS (SECOND COMMUNICATION DEVICE)

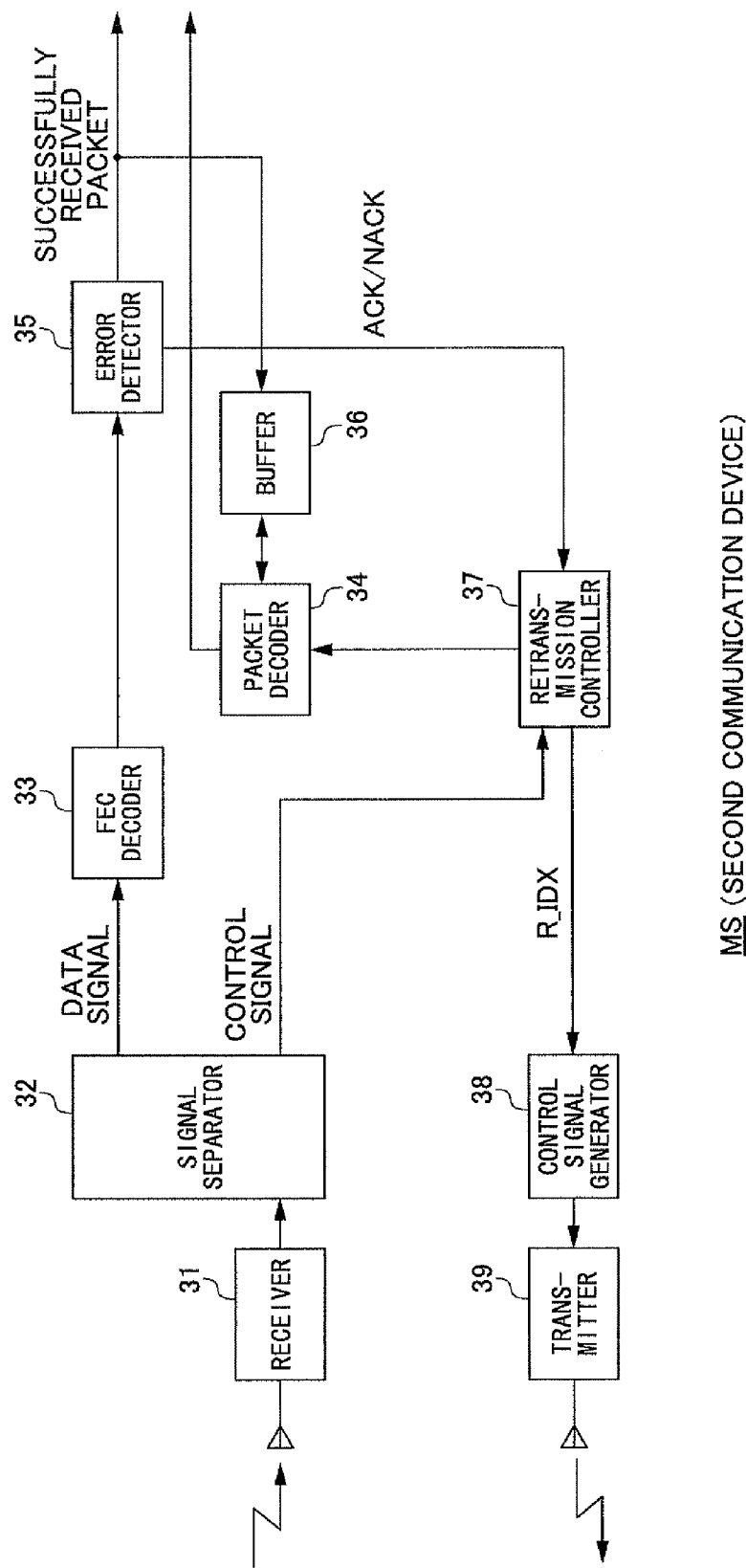

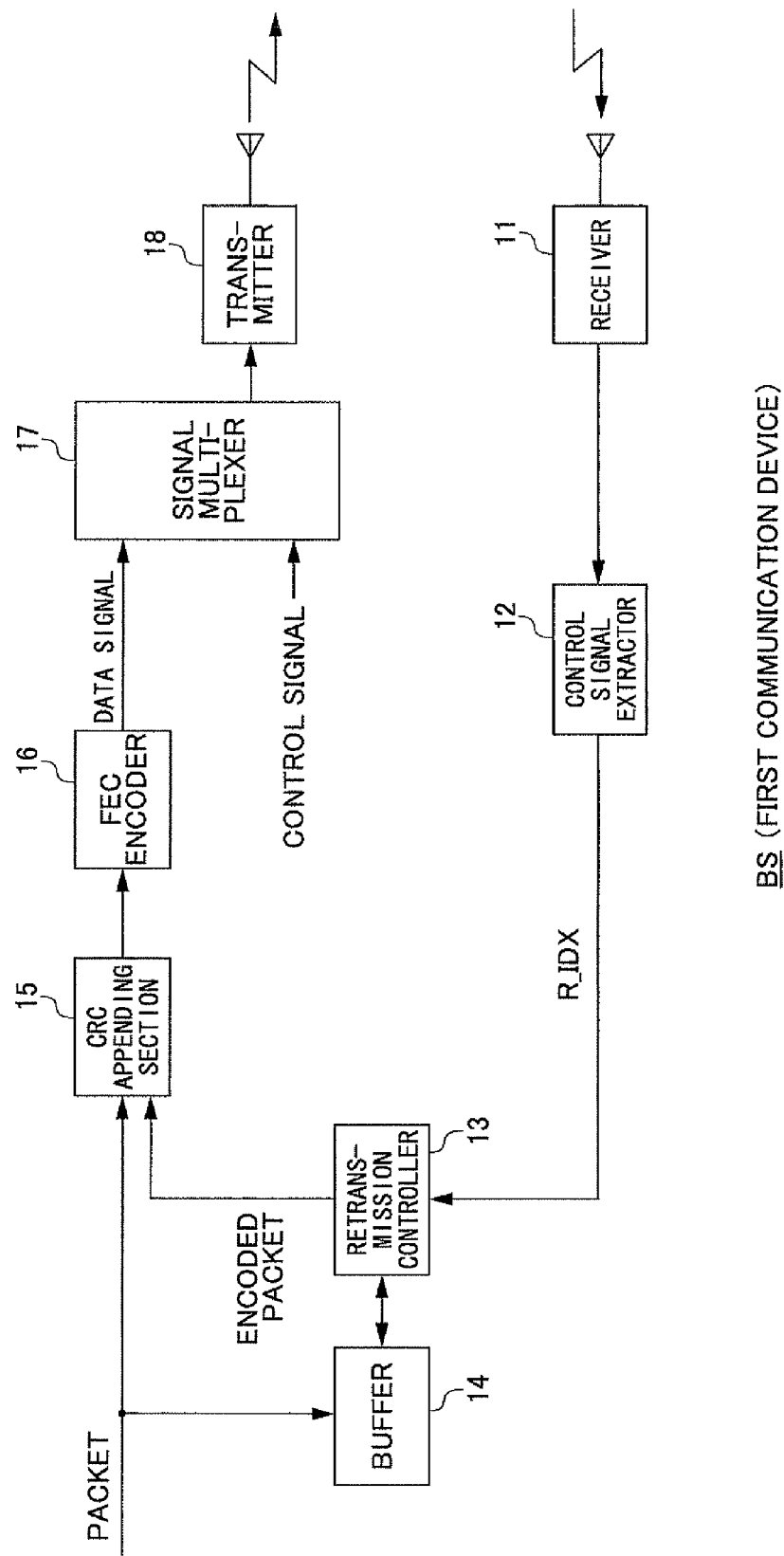

FIG.5

| ERROR PATTERN | $P_1$ | $P_2$ | $P_3$ | $P_4$ | NUMBER OF ERRORS M | R_IDX |
|---|---|---|---|---|---|---|
| 0 | ACK | ACK | ACK | ACK | 0 | 0 |
| 1 | NACK | ACK | ACK | ACK | 1 | 1 |
| 2 | ACK | NACK | ACK | ACK | 1 | 1 |
| 3 | ACK | ACK | NACK | ACK | 1 | 1 |
| 4 | ACK | ACK | ACK | NACK | 1 | 1 |
| 5 | NACK | NACK | ACK | ACK | 2 | 2 |
| 6 | NACK | ACK | NACK | ACK | 2 | 3 |
| 7 | NACK | ACK | ACK | NACK | 2 | 2 |
| 8 | ACK | NACK | NACK | ACK | 2 | 2 |
| 9 | ACK | NACK | ACK | NACK | 2 | 3 |
| 10 | ACK | ACK | NACK | NACK | 2 | 2 |
| 11 | NACK | NACK | NACK | ACK | 3 | 4 |
| 12 | NACK | NACK | ACK | NACK | 3 | 4 |
| 13 | NACK | ACK | NACK | NACK | 3 | 4 |
| 14 | ACK | NACK | NACK | NACK | 3 | 4 |
| 15 | NACK | NACK | NACK | NACK | 4 | 5 |

FIG.6

| R_IDX | ENCODING METHOD IN RETRANSMISSION |
|---|---|
| 0 | NO RETRANSMISSION (ALL SUCCESSFULLY RECEIVED) |
| 1 | $G_{1,0} = \begin{pmatrix} 1 & 1 & 1 & 1 \end{pmatrix}$ |
| 2 | $G_{2,0} = \begin{pmatrix} 1 & 1 & 1 & 1 \\ 1 & 0 & 1 & 0 \end{pmatrix}$ |
| 3 | $G_{2,1} = \begin{pmatrix} 1 & 1 & 1 & 1 \\ 1 & 0 & 0 & 1 \end{pmatrix}$ |
| 4 | $G_{3,0} = \begin{pmatrix} 1 & 1 & 1 & 1 \\ 1 & 0 & 1 & 0 \\ 1 & 0 & 0 & 1 \end{pmatrix}$ |
| 5 | $G_{4,0} = 1$ (4 × 4 UNIT MATRIX) |

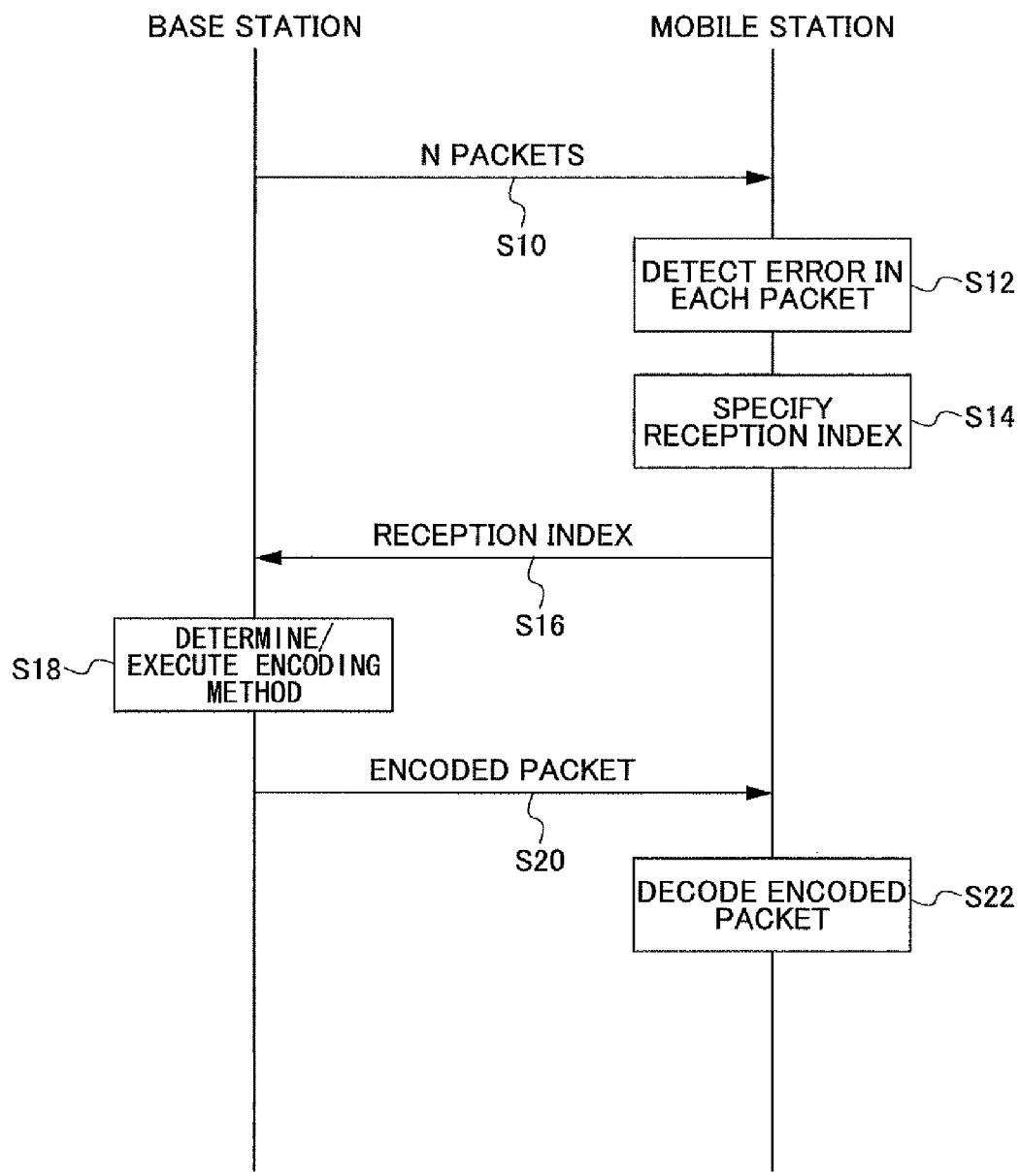

FIG.8

| R_IDX | M | k | ELEMENTS OF M × 8 ENCODING MATRIX $G_{M,k}$ | | | | | | | |
|---|---|---|---|---|---|---|---|---|---|---|
| 0 | 0 | 0 | NO RETRANSMISSION | | | | | | | |
| 1 | 1 | 0 | 1 | 1 | 1 | 1 | 1 | 1 | 1 | 1 |
| 2 | 2 | 0 | 1 | 1 | 0 | 1 | 0 | 1 | 1 | 0 |
|   |   |   | 0 | 1 | 1 | 1 | 1 | 0 | 0 | 1 |
| 3 | 2 | 1 | 1 | 0 | 1 | 1 | 0 | 1 | 0 | 1 |
|   |   |   | 1 | 1 | 0 | 0 | 1 | 0 | 1 | 1 |
| 4 | 3 | 0 | 1 | 0 | 1 | 0 | 1 | 1 | 1 | 1 |
|   |   |   | 1 | 1 | 0 | 1 | 0 | 1 | 0 | 0 |
|   |   |   | 1 | 1 | 1 | 0 | 0 | 0 | 1 | 0 |
| 5 | 3 | 1 | 0 | 1 | 1 | 0 | 0 | 1 | 1 | 1 |
|   |   |   | 0 | 0 | 0 | 0 | 1 | 0 | 1 | 0 |
|   |   |   | 1 | 0 | 0 | 1 | 0 | 0 | 0 | 1 |
| 6 | 3 | 2 | 0 | 1 | 0 | 1 | 1 | 1 | 0 | 0 |
|   |   |   | 1 | 1 | 1 | 1 | 0 | 0 | 0 | 0 |
|   |   |   | 1 | 0 | 0 | 1 | 1 | 1 | 1 | 1 |
| 7 | 4 | 0 | 1 | 1 | 0 | 0 | 0 | 0 | 1 | 0 |
|   |   |   | 0 | 1 | 1 | 1 | 0 | 0 | 1 | 0 |
|   |   |   | 1 | 0 | 1 | 0 | 0 | 1 | 1 | 1 |
|   |   |   | 0 | 1 | 0 | 0 | 1 | 1 | 0 | 0 |
| 8 | 4 | 1 | 0 | 0 | 0 | 1 | 1 | 1 | 1 | 1 |
|   |   |   | 1 | 0 | 1 | 0 | 1 | 0 | 1 | 1 |
|   |   |   | 0 | 1 | 0 | 1 | 1 | 0 | 0 | 1 |
|   |   |   | 0 | 1 | 1 | 1 | 1 | 1 | 0 | 0 |
| 9 | 4 | 2 | 1 | 0 | 0 | 1 | 1 | 1 | 1 | 0 |
|   |   |   | 1 | 0 | 0 | 1 | 0 | 1 | 0 | 1 |
|   |   |   | 0 | 1 | 0 | 1 | 1 | 0 | 1 | 1 |
|   |   |   | 0 | 1 | 1 | 0 | 1 | 1 | 0 | 1 |

FIG.9

| R_IDX | M | k | ELEMENTS OF M × 8 ENCODING MATRIX $G_{M,k}$ |
|---|---|---|---|
| 10 | 5 | 0 | 1 1 1 0 1 1 0 0<br>1 1 0 1 1 1 1 0<br>1 1 1 1 0 0 1 1<br>0 1 0 0 0 0 1 0<br>0 0 0 0 1 0 1 0 |
| 11 | 5 | 1 | 1 0 1 0 1 1 1 0<br>0 1 1 1 1 0 0 0<br>0 1 1 1 1 1 1 0<br>1 0 0 1 1 1 0 1<br>1 0 1 1 0 0 0 1 |
| 12 | 5 | 2 | 0 0 1 1 1 1 0 1<br>0 0 1 0 0 0 1 1<br>0 0 0 0 0 1 0 1<br>1 1 1 0 0 1 1 1<br>0 1 0 1 0 0 1 1 |
| 13 | 6 | 0 | 1 1 1 1 0 1 0 0<br>0 0 1 1 1 1 0 0<br>0 1 1 1 1 0 0 1<br>1 1 1 0 0 1 0 1<br>1 0 1 1 0 1 1 0<br>1 1 1 1 1 1 0 1 |
| 14 | 6 | 1 | 1 0 0 0 1 0 1 0<br>1 0 0 0 0 0 0 1<br>0 1 1 1 1 1 1 1<br>1 0 1 0 1 0 0 1<br>0 1 1 0 0 1 1 0<br>0 1 0 0 0 0 1 1 |
| 15 | 7 | 0 | 0 1 0 0 0 0 1 0<br>0 0 1 0 1 1 0 1<br>0 0 1 1 0 0 0 0<br>1 1 0 1 1 0 0 0<br>0 1 1 1 0 0 0 1<br>0 1 0 0 1 1 0 1<br>0 0 1 1 0 1 0 1 |
| 16 | 8 | 0 | 1 0 0 0 0 0 0 0<br>0 1 0 0 0 0 0 0<br>0 0 1 0 0 0 0 0<br>0 0 0 1 0 0 0 0<br>0 0 0 0 1 0 0 0<br>0 0 0 0 0 1 0 0<br>0 0 0 0 0 0 1 0<br>0 0 0 0 0 0 0 1 |

FIG.10

| N | NUMBER OF ENCODING MATRICES | FEED BACK INFORMATION AMOUNT IN THIS EMBODIMENT (NUMBER OF BITS) | FEED BACK INFORMATION AMOUNT WHEN ONE BIT IS FED BACK FOR EACH PACKET (NUMBER OF BITS) |
|---|---|---|---|
| 1 | 2 | 1 | 1 |
| 2 | 3 | 2 | 2 |
| 3 | 4 | 2 | 3 |
| 4 | 6 | 3 | 4 |
| 5 | 8 | 3 | 5 |
| 6 | 10 | 4 | 6 |
| 7 | 12 | 4 | 7 |
| 8 | 17 | 5 | 8 |
| 9 | 23 | 5 | 9 |
| 10 | 32 | 5 | 10 |
| 11 | 45 | 6 | 11 |

COMMUNICATION METHOD, COMMUNICATION SYSTEM, TRANSMISSION DEVICE, AND RECEIVING DEVICE

CROSS-REFERENCE TO RELATED APPLICATION

This application is a U.S. continuation application filed under 35 USC 111(a) claiming benefit under 35 USC 120 and 365(c) of PCT international application PCT/JP2009/004691, filed Sep. 17, 2009, the disclosure of which is hereby incorporated by reference.

FIELD

The embodiment discussed herein is related to a transmission method, a transmission system, a transmission device, and a receiving device.

BACKGROUND

There has been a known packet communication system in which upon a packet transmitted from a transmission device being not correctly received by a receiving device, the receiving device does not feeds back ACK (reception succeeded) but feeds back NACK (reception failed) to the transmission device, so that the transmission device retransmits the reception-failed packet. For example, International Publication Pamphlet No. WO2003/028314 discloses a technique in which the transmission device transmits plural packets and the receiving device collectively feeds back the ACK/NACK of each of the packets.

SUMMARY

According to an aspect, a communication method of transmitting plural packets from a first communication device to a second communication device includes associating identification information items with combinations of reception results of the plural packets in the second communication device, a number of the identification information items being less than a number of the plural packets; transmitting, by the first communication device, the plural packets to the second communication device in initial transmission; specifying, by the second communication device, a first of the identification information items based on reception results of the plural packets in initial reception, and transmitting, by the second communication device, the first identification information item to the first communication device; determining, by the first communication device, an encoding method decodable by the second communication device with successfully received packets in the initial reception, encoding, by the first communication device, the plural packets based on the determined encoding method, and retransmitting, by the first communication device, the encoded packets to the second communication device; and decoding, by the second communication device, the encoded packets based on the successfully received packets in the initial reception, and reproducing, by the second communication device, incorrectly received packets in the initial reception.

The object and advantage of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 3 is a block diagram illustrating a main part of an internal configuration of a mobile station according to an embodiment;

FIG. 4 is a block diagram illustrating a main part of an internal configuration of a base station according to an embodiment;

FIG. 5 is a table illustrating corresponding relationships between error patterns and reception indexes;

FIG. 6 is a table illustrating corresponding relationships between the reception indexes and encoding methods adapted in the base station;

FIG. 7 is a flowchart illustrating transmission of plural packets from the base station to the mobile station;

FIG. 8 is a table illustrating encoding matrixes set when the number of transmission packets is eight;

FIG. 9 is another table illustrating encoding matrixes set when the number of transmission packets is eight; and FIG. 10 is a table illustrating a result of searching for the number of the encoding methods where feed-back information amount is minimum.

DESCRIPTION OF EMBODIMENT

In a communication system of the related art, the fed-back information transmitted from the receiving device receiving packets to the transmission device refers to the information of the ACK/NACK (1 bit) for each packet. Therefore, the amount of the information to be fed back to the transmission device refers to the number of bits equal to the number of packets to be transmitted.

On the other hand, in a cellular communication system such as LTE (Long Term Evolution) which has been researched by the 3GPP (3rd Generation Partnership Project), in many cases, it may be operated under comparatively higher packet reception error rates due to interference noise and multi-path fading environments; therefore, the retransmission rate of the packets may occur with higher incidence.

Further, in the downlink of the cellular communication system, data to be transmitted to many users (mobile stations) may be multiplexed into the same sub frames, and the ACK/NACK information items from many mobiles stations are fed back to the base station. In the communication system, the greater the information amount fed back to the base station, the more radio resources are consumed. Therefore, there is a demand to reduce the feed-back information amount described above.

Namely, it may be requested to provide a communication method, a communication system, a transmission device, and a receiving device that may reduce the amount of information to be fed back from the receiving-side transmission device to the transmitting-side communication device.

In the following, as a communication system according to an embodiment of the present invention, a wireless communication system including a base station as a first communication device or a transmission device and a mobile station as a second communication device or a receiving device is described.

(1) Wireless Communication System in an Embodiment

Figure 1:
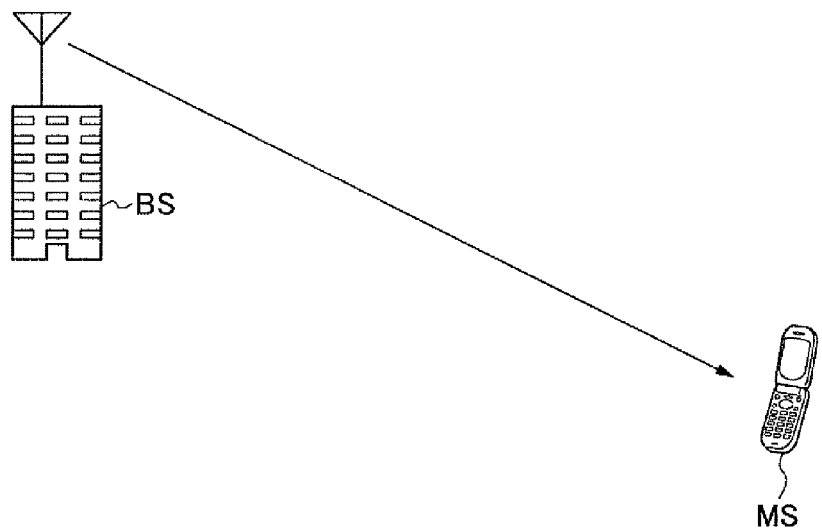
FIG. 1 is a drawing illustrating a wireless communication system according to an embodiment.

FIG. 1 illustrates a wireless communication system according to an embodiment. As illustrated in FIG. 1, the wireless communication system according to this embodiment includes a base station (BS) and a mobile station (MS) in a service area of the wireless base station. In this embodiment, a case is described where plural packets are transmitted from the base station to the mobile station.

In this wireless communication system, the packet transmission is performed in a manner such that a predetermined number equal to two or more of packets (i.e., plural packets) are transmitted as a unit of a transmission from the base station to the mobile station. The mobile station determines whether each of the plural packets is received correctly (successfully) (ACK) or fails to be received correctly (incorrectly) (NACK), and feeds back the results to the base station.

Here, between the base station and the mobile station, there are provided identification information items which are associated with (assigned to) corresponding combinations of ACK (correctly received or successful reception) and NACK (incorrectly received, or reception failure) results of the plural packets in the mobile station. In the description of this embodiment, the identification information is described as (called) a "reception index". The mobile station feeds back the reception index corresponding to the reception results of the plural packets to the base station.

In this wireless communication system, the base station determines an encoding method decodable by using the packets having been successfully received when the packets are initially received by the second communication device (i.e., the mobile station). Further, based on the determined encoding method, the base station encodes the plural packets to be transmitted (to generate encoded packets). Then, the encoded packets are transmitted to the mobile station. The mobile station reproduces (regenerates) the packets having been incorrectly received in the initial transmission by decoding the encoded packets using correctly received packets in the initial transmission.

(2) Generation of Encoded Packets

Figure 2:
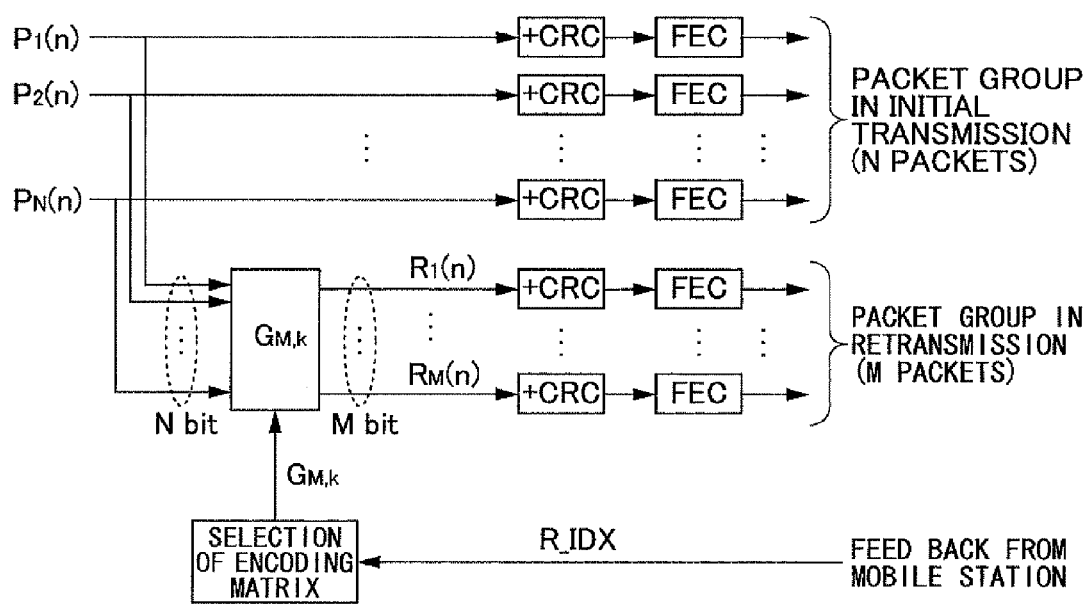
FIG. 2 is a drawing illustrating a generation of encoded packets according to an embodiment.

Next, the generation of the encoded packets is described with reference to FIG. 2. FIG. 2 illustrates the generation of the encoded packets in this embodiment.

In FIG. 2, symbols $P_1, P_2, \ldots, P_N$ are assumed to be (denote) the plural packets (N packets) in the initial transmission (which refers to the packets that are initially transmitted) from the base station to the mobile station. In the initial transmission, CRC (Cyclic Redundancy Check) codes for error detection are appended to the plural packets and FEC (Forward Error Correction) coding is further performed on the plural packets.

After that, the plural packets are transmitted to the mobile station. On the other hand, in the retransmission, the reception index ("R_IDX") is fed back from the mobile station, and the coding method corresponding to the reception index is selected.

Here, in a case where N packets are transmitted and M packets (from among the N packets) have not been correctly received, the encoding method in this case is expressed as in the following formula (1) by using M×N encoding matrix $G_{M,K}$. Here, the symbol "k" refers to a sequentially assigned number to identify one of the encoding matrixes $G_{M,K}$ which is relevant to the same number of errors "M" (error number "M").

$$\begin{pmatrix} R_1(n) \\ R_2(n) \\ \vdots \\ R_M(n) \end{pmatrix} = G_{M,k} \begin{pmatrix} P_1(n) \\ P_2(n) \\ \vdots \\ P_N(n) \end{pmatrix} \mod 2 \quad (1)$$

In formula (1), symbols $P_2(n), P_2(n), \ldots,$ and $P_N(n)$ denote corresponding nth one bit of N packets $P_1, P_2, \ldots,$ and $P_N$. Then, the extracted N bits are multiplied by the M×N encoding matrix $G_{M,K}$ to obtain N bits of $R_2(n), R_2(n), \ldots,$ and $R_N(n)$. By executing this matrix operation on each bit of N packets, M retransmission packets (encoded packets) are generated.

In each of the operations in the above formula (1), a "mod-2" operation is performed.

(3) Configurations of Base Station and Mobile Station

Next, configurations of the base station (transmission device) and the mobile station (receiving device) in the wireless communication system according to this embodiment are described with reference to FIGS. 3 and 4.

FIG. 3 is a block diagram illustrating a main (relevant) part of an internal configuration of the mobile station, and FIG. 4 is a block diagram illustrating a main part of an internal configuration of the base station.

Configuration of Mobile Station (Receiving Device)

As illustrated in FIG. 3, the mobile station includes a receiver 31, a signal separator 32, an FEC decoder 33, a packet decoder 34, an error detector 35, a buffer 36, a retransmission controller 37, a control signal generator 38, and a transmitter 39.

The signal separator 32 separates (extracts) a data signal and a control signal from a baseband signal acquired by the receiver 31. For example, when an OFDM (Orthogonal Frequency Division Multiplexing) communication scheme is employed, the signal separator 32 generates a symbol sequence of each of sub carriers based on an FFT process. Then, the data signal and the control signal inserted into a predetermined sub carrier are separated.

The data signal and the control signal acquired by the signal separator 32 are output to the FEC decoder 33. The control signal acquired by the signal separator 32 is decoded and output to the retransmission controller 37.

The FEC decoder 33 sequentially decodes the data signal by the unit of packets, the data signal being from the signal separator 32.

The error detector 35 detects an error by using a CRC bit appended to the packet. As a result of the error detection, an ACK signal (reception succeeded) or a NACK signal (reception failed) for each of the packets is output to the retransmission controller 37. A successfully (correctly) received packet is output to an upper layer and also stored in the buffer 36.

The packet decoder 34 decodes the encoded packet using the correctly received packet in the buffer 36 under the control of the retransmission controller 37, the encoded packet being transmitted from the base station when the packet is retransmitted. Details of the decoding process are described below.

The retransmission controller 37 determines whether the received packet is an initially received packet (i.e., the packet when the base station initially transmits) or the encoded packet upon being retransmitted based on the received control signal. Then, when determining that the received packet is the encoded packet, the retransmission controller 37 controls the packet decoder 34.

Further, in the wireless communication system, between the mobile station and the base station, the specific reception indexes (identification information items) are associated in advance with corresponding combinations of the ACK (correctly received or successful reception) and the NACK (incorrectly received, or reception failure) results of the plural packets.

Further, the retransmission controller 37 specifies the reception index based on the error detection results of the packets by the error detector 35. The reception index R_IDX is multiplexed with (into) the control signal by the control signal generator 38, and transmitted to the base station by the transmitter 39.

Configuration of Base Station (Transmission Device)

As illustrated in FIG. 4, the base station includes a receiver 11, a control signal extractor 12, a retransmission controller 13, a buffer 14, a CRC appending section 15, an FEC encoder 16, a signal multiplexer 17, and transmitter 18.

The receiver 11 converts a received RF signal into a digital baseband signal. The control signal extractor 12 extracts the control signal by performing a predetermined signal separation process and also demodulation and decoding processes on the baseband signal.

The control signal includes the reception index corresponding to the reception results of the plural packets transmitted to the mobile station. The control signal extractor 12 outputs the reception index R_IDX to the retransmission controller 13.

The plural packets to be transmitted to the mobile station are stored in the buffer 14 before being initially transmitted for retransmission control.

When the packets are to be retransmitted, based on the reception index from the control signal extractor 12, the retransmission controller 13 selects one of the plural encoding methods provided. Further, the retransmission controller 13 generates the encoded packets from the plural packets in the buffer 14 based on the selected encoding method.

In this case, the retransmission controller 13 determines the encoding method decodable based on the correctly received packets in the mobile station in the initial transmission from among the plural packets to be transmitted in the buffer 14. Based on the determined encoding method, the retransmission controller 13 encodes the plural packets to be transmitted. Details of the encoding process are described below.

The CRC appending section 15 appends CRC bits to newly input packets or the encoded packets from the retransmission controller 13 for error detection. For error correction, the FEC encoder 16 performs encoding on the packets to which the CRC bits are appended, the encoding for the error correction being determined between the base station and the mobile station in advance.

The signal multiplexer 17 multiplexes the data signal (packets) from the FEC encoder 16 with the control signal, to generate a baseband signal to be transmitted. For example, when an OFDMA communication scheme is employed, an IFFT (Inverse Fast Fourier Transform) process is performed to convert subcarriers into a time-domain signal.

The transmitter 18 upconverts the baseband signal from the signal multiplexer 17 from the baseband frequency to a radio frequency and the like, and emits to air (transmits the RF signal) via an antenna.

(4) Example of Packet Encoding Process and Decoding Process in Retransmission

Next, a packet encoding process and a decoding process in the retransmission of packets are specifically described by referring to an example where the number of packets to be transmitted is four with reference to FIGS. 5 and 6.

FIG. 5 is a table illustrating relationships between plural error patterns (combinations of errors) assuming that the number of packets is four and the reception indexes R_IDX correspond to the plural error patterns.

FIG. 6 is a table illustrating corresponding relationships between the reception indexes R_IDX and the corresponding encoding methods (encoding matrixes) to be applied by the base station.

Further, the operations described below are bit operations (MOD-2 operation).

As illustrated in FIG. 5, in response to four packets $P_1$, $P_2$, $P_3$, and $P_4$ from the base station, there are sixteen possible combinations of the reception states (ACK or NACK) (i.e., error patterns 0 through 15) in the mobile station. In the mobile station, those sixteen error patterns are associated with corresponding reception indexes in advance as illustrated in FIG. 5.

When referring to FIG. 3 again, the retransmission controller 37 of the mobile station determines the reception index R_IDX by referring to the corresponding relationship of FIG. 5 based on the reception states (ACK or NACK) of the packets, the reception states being given from the error detector 35, and feeds back the reception index to the base station.

The corresponding relationships between the reception indexes R_IDX and the encoding matrixes are assumed to be known to the base station in advance. Here, when referring to FIG. 2, the retransmission controller 13 of the base station (see FIG. 4) selects the encoding method (encoding matrix) for the retransmission based on the reception index R_IDX fed back from the mobile station, and generates the encoded packets.

Here, it is assumed that N=4 and also M×4 matrixes as the encoding matrix $G_{M,K}$ are set (established). Further, the number of generated encoded packets is equal to the number of incorrectly received packet in the mobile station.

(4-1) In a Case Where the Number of Errors (M) is "0"

In this case, as the reception index R_IDX, data "0" is fed back from the mobile station to the base station. By doing this, the base station recognizes that all packets have been correctly received, and no retransmission may have to be performed.

(4-2) In a Case Where the Number of Errors (M) is "1"

In this case, as illustrated in FIG. 5, when any one of the four packets is incorrectly received, a value "1" is fed back from the mobile station to the base station as the reception index R_IDX. Then, as illustrated in FIG. 6, the base station selects the encoding matrix $G_{1,0}$ corresponding to the fed-back reception index, and generates the encoded packets.

Specifically, the selected encoding matrix $G_{1,0}$ is expressed in the following formula (2). Therefore, when the encoded packet is given as $R_1$, the $R_1$ is given as illustrated in formula (3). In this case, only the single encoded packet is transmitted as the retransmission packet to the mobile station.

Here, the symbols $R_1$, $P_1$, $P_2$, $P_3$, and $P_4$ denote nth bit similar to formula (1). However, in the following, it is assumed that a similar process is performed for each of the (n) bits. Therefore, the description of the factor "n" may be omitted.

$$G_{1,0} = (1\ 1\ 1\ 1) \tag{2}$$

$$R_1 = P_1 + P_2 + P_3 + P_4 \tag{3}$$

In the mobile station, successfully (correctly) received packets (i.e., three packets) are known. Therefore, when the encoded packet $R_1$ is received, the three successfully received packets are cancelled (subtracted) from the encoded packet $R_1$. Further, as described above, in this embodiment, the mod-2 operation is performed as the operation. Therefore, the same result may be acquired by performing an addition operation as the cancel (subtraction) operation.

By doing this, the mobile station may correctly reproduce (decode) the packet which has not been correctly received in the initial transmission of the packet. For example, when assuming that the packet $P_4$ is the incorrectly received packet, by performing the operation based on following formula (4), it may become possible to reproduce the packet $P_4$.

$$R_1 - P_2 - P_3 = P_4 \qquad (4)$$

The encoded packet $R_1$ is the sum of all the packets $P_1$, $P_2$, $P_3$, and $P_4$. Therefore, even when the incorrectly received packet is any one of those packets in the initial transmission, the incorrectly received packet may be similarly reproduced by cancelling the three successfully received packets from the encoded packet $R_1$.

Here, it should be noted is that in response to any of the four error patterns where the number of errors is "1", the same value ("1") is fed back to the base station as the reception index. Namely, there is no information indicating which of the four packets is the incorrectly received packet among the four packets transmitted from the mobile station to the base station.

Namely, when compared with a system where all the reception states (results) (ACK/NACK) of the packets are fed back (i.e., four bits are necessary), it may become possible to reduce an amount of feed-back information (feed-back information amount) in a system according to this embodiment.

(4-3) In a Case Where the Number of Errors (M) is "2"

In this case, a value "2" or "3" is fed back from the mobile station to the base station as the reception index R_IDX. Further, the base station selects an encoding matrix $G_{2,0}$ or $G_{2,1}$ in response to the fed-back reception index, and generates the encoded packets.

Error Pattern "5" (NACK, NACK, ACK, ACK)

In a case of an error pattern "5", as illustrated in FIGS. 5 and 6, the reception index R_IDX fed back to the base station is "2", and the encoding matrix $G_{2,0}$ is selected by the base station. In this case, two encoded packets $R_1$ and $R_2$ to be retransmitted to the mobile station are acquired based on the following formula (5).

$$\begin{pmatrix} R_1 \\ R_2 \end{pmatrix} = G_{2,0} \begin{pmatrix} P_1 \\ P_2 \\ P_3 \\ P_4 \end{pmatrix} = \begin{pmatrix} 1 & 1 & 1 & 1 \\ 1 & 0 & 1 & 0 \end{pmatrix} \begin{pmatrix} P_1 \\ P_2 \\ P_3 \\ P_4 \end{pmatrix} \qquad (5)$$

In the mobile station, the successfully (correctly) received packets (i.e., two packets $R_3$ and $R_4$) are known. Therefore, when the encoded packets $R_1$ and $R_2$ are received, by cancelling (subtracting) the two successfully received packets from the encoded packets $R_1$ and $R_2$, as illustrated in the formula (6), the encoded packets $R_1'$ and $R_2'$ after the cancel operation may be obtained.

$$\begin{pmatrix} R_1' \\ R_2' \end{pmatrix} = \begin{pmatrix} R_1 \\ R_2 \end{pmatrix} - \begin{pmatrix} 1 & 1 \\ 1 & 0 \end{pmatrix} \begin{pmatrix} P_3 \\ P_4 \end{pmatrix} = \begin{pmatrix} 1 & 1 \\ 1 & 0 \end{pmatrix} \begin{pmatrix} P_1 \\ P_2 \end{pmatrix} \qquad (6)$$

Based on the formula (6), the packet $P_1$ is acquired as the encoded packet $R_2'$, and the packet $P_2$ is acquired by subtracting the packet $P_1$ (i.e., $R_2'$) from the encoded packet $R_1'$.

Namely, the matrix in the right member of formula (6) has an inverse matrix; therefore, $P_1$ and $P_2$ may be calculated based on $R_1'$ and $R_2'$.

Error Pattern "7" (NACK, ACK, ACK, NACK)

In a case of an error pattern "7", as illustrated in FIGS. 5 and 6, the reception index R_IDX fed back to the base station is "2", and the encoding matrix $G_{2,0}$ is selected by the base station. In this case, by cancelling the known successfully received packets (i.e., two packets $P_2$ and $P_3$) from the two encoded packets $R_1$ and $R_2$ (see formula (5)), as illustrated in formula (7), the encoded packets $R_1'$ and $R_2'$ after the cancel operation may be acquired (calculated).

$$\begin{pmatrix} R_1' \\ R_2' \end{pmatrix} = \begin{pmatrix} R_1 \\ R_2 \end{pmatrix} - \begin{pmatrix} 1 & 1 \\ 0 & 1 \end{pmatrix} \begin{pmatrix} P_2 \\ P_3 \end{pmatrix} = \begin{pmatrix} 1 & 1 \\ 1 & 0 \end{pmatrix} \begin{pmatrix} P_1 \\ P_4 \end{pmatrix} \qquad (7)$$

In this case similar to the case of the error pattern "5", the packets $P_1$ and $P_4$ may be reproduced (decoded).

Error Pattern "8" (ACK, NACK, NACK, ACK)

In a case of an error pattern "8", as illustrated in FIGS. 5 and 6, the reception index R_IDX fed back to the base station is "2", and the encoding matrix $G_{2,0}$ is selected by the base station. In this case, by cancelling the known successfully received packets (i.e., two packets $P_1$ and $P_4$) from the two encoded packets $R_1$ and $R_2$ (see formula (5)), as illustrated in formula (8), the encoded packets $R_1'$ and $R_2'$ after the cancel operation may be acquired (calculated).

$$\begin{pmatrix} R_1' \\ R_2' \end{pmatrix} = \begin{pmatrix} R_1 \\ R_2 \end{pmatrix} - \begin{pmatrix} 1 & 1 \\ 1 & 0 \end{pmatrix} \begin{pmatrix} P_1 \\ P_4 \end{pmatrix} = \begin{pmatrix} 1 & 1 \\ 0 & 1 \end{pmatrix} \begin{pmatrix} P_2 \\ P_3 \end{pmatrix} \qquad (8)$$

In this case, similar to the case of the error pattern "5", the packets $P_2$ and $P_3$ may be reproduced (decoded).

Error Pattern "10" (ACK, ACK, NACK, NACK)

In a case of an error pattern "10", as illustrated in FIGS. 5 and 6, the reception index R_IDX fed back to the base station is "2", and the encoding matrix $G_{2,0}$ is selected by the base station. In this case, by cancelling the known successfully received packets (i.e., two packets $P_1$ and $P_2$) from the two encoded packets $R_1$ and $R_2$ (see formula (5)), as illustrated in formula (9), the encoded packets $R_1'$ and $R_2'$ after the cancel operation may be acquired (calculated).

$$\begin{pmatrix} R_1' \\ R_2' \end{pmatrix} = \begin{pmatrix} R_1 \\ R_2 \end{pmatrix} - \begin{pmatrix} 1 & 1 \\ 1 & 0 \end{pmatrix} \begin{pmatrix} P_1 \\ P_2 \end{pmatrix} = \begin{pmatrix} 1 & 1 \\ 1 & 0 \end{pmatrix} \begin{pmatrix} P_3 \\ P_4 \end{pmatrix} \qquad (9)$$

In this case, similar to the case of the error pattern "5", the packets $P_3$ and $P_4$ may be reproduced (decoded).

Error Pattern "6" (NACK, ACK, NACK, ACK)

In a case of an error pattern "6", as illustrated in FIGS. 5 and 6, the reception index R_IDX fed back to the base station is "3", and the encoding matrix $G_{2,1}$ is selected by the base station. In this case, two encoded packets $R_1$ and $R_2$ to be retransmitted to the mobile station are given in the following formula (10).

$$\begin{pmatrix} R_1 \\ R_2 \end{pmatrix} = G_{2,1} \begin{pmatrix} P_1 \\ P_2 \\ P_3 \\ P_4 \end{pmatrix} = \begin{pmatrix} 1 & 1 & 1 & 1 \\ 1 & 0 & 0 & 1 \end{pmatrix} \begin{pmatrix} P_1 \\ P_2 \\ P_3 \\ P_4 \end{pmatrix} \quad (10)$$

In the mobile station, the successfully (correctly) received packets (two packets $R_2$ and $R_4$) are known. Therefore, when the encoded packets $R_1$ and $R_2$ are received, by cancelling (subtracting) the two successfully received packets from the encoded packets $R_1$ and $R_2$, as illustrated in the formula (11), the encoded packets $R_1'$ and $R_2'$ after the cancel operation may be obtained. This is similar to the case of the error pattern "5" in that the encoded packets $R_1'$ and $R_2'$ may be reproduced (decoded) based on the formula (11).

$$\begin{pmatrix} R_1' \\ R_2' \end{pmatrix} = \begin{pmatrix} R_1 \\ R_2 \end{pmatrix} - \begin{pmatrix} 1 & 1 \\ 0 & 1 \end{pmatrix} \begin{pmatrix} P_2 \\ P_4 \end{pmatrix} = \begin{pmatrix} 1 & 1 \\ 1 & 0 \end{pmatrix} \begin{pmatrix} P_1 \\ P_3 \end{pmatrix} \quad (11)$$

Next, a reason why the encoding matrix $G_{2,1}$ selected in the case of the error pattern "6" is different from that selected in the cases the error patterns "5", "7", "8", and "10" (i.e., a reason why another reception index is selected) is described.

In the case of the error pattern "6", when it is assumed that not the encoding matrix $G_{2,1}$ but the encoding matrix $G_{2,0}$ is selected, based on the formula (5), the encoded packets $R_1'$ and $R_2'$ may be given as in the following formula (12). As is apparent from the formula (12), if the encoding matrix $G_{2,0}$ is selected, it may not be possible to uniquely determine the packets $R_1$ and $R_2$.

This occurs because the matrix in the right member of formula (12) does not have an inverse matrix. Therefore, in the case of the error pattern "6", the encoding matrix $G_{2,1}$ different from the encoding matrix $G_{2,0}$ is set (selected) so that the matrix acquired by cancelling the successfully received packets from the encoded packets has the inverse matrix.

$$\begin{pmatrix} R_1' \\ R_2' \end{pmatrix} = \begin{pmatrix} R_1 \\ R_2 \end{pmatrix} - \begin{pmatrix} 1 & 1 \\ 0 & 0 \end{pmatrix} \begin{pmatrix} P_2 \\ P_4 \end{pmatrix} = \begin{pmatrix} 1 & 1 \\ 1 & 1 \end{pmatrix} \begin{pmatrix} P_1 \\ P_3 \end{pmatrix} \quad (12)$$

Error Pattern "9" (ACK, NACK, ACK, NACK)

In a case of an error pattern "9", as illustrated in FIGS. 5 and 6, the reception index R_IDX fed back to the base station is "3", and the encoding matrix $G_{2,1}$ is selected by the base station. In this case, by cancelling the known successfully received packets (i.e., two packets $P_1$ and $P_3$) from the two encoded packets $R_1$ and $R_2$ (see formula (10)), as illustrated in formula (13), the encoded packets $R_1'$ and $R_2'$ after the cancel operation may be acquired (calculated). Based on the formula (13), the packets $P_2$ and $P_4$ may be reproduced (decoded).

$$\begin{pmatrix} R_1' \\ R_2' \end{pmatrix} = \begin{pmatrix} R_1 \\ R_2 \end{pmatrix} - \begin{pmatrix} 1 & 1 \\ 1 & 0 \end{pmatrix} \begin{pmatrix} P_1 \\ P_3 \end{pmatrix} = \begin{pmatrix} 1 & 1 \\ 0 & 1 \end{pmatrix} \begin{pmatrix} P_2 \\ P_4 \end{pmatrix} \quad (13)$$

As described above, the encoding process and the decoding process in a case where the number of errors (M) is "2" are described. In a case where the number of errors (M) is "2", the 2×4 encoding matrix (a first matrix) is set (selected) in a manner such that a 2×2 (2: the number of errors (M)) square matrix (a second matrix) which is decomposed (degenerated) from the 2×4 encoding matrix (the first matrix) has the inverse matrix.

The square matrix is acquired after the successfully received packets are cancelled from the encoded packets, and is given as in the following formula (14) or (15) when the number of errors (M) is "2". (where symbols "I" and "j" denote any value from 1 to 4, respectively)

$$\begin{pmatrix} R_1' \\ R_2' \end{pmatrix} = \begin{pmatrix} 1 & 1 \\ 1 & 0 \end{pmatrix} \begin{pmatrix} P_i \\ P_j \end{pmatrix} \quad (14)$$

$$\begin{pmatrix} R_1' \\ R_2' \end{pmatrix} = \begin{pmatrix} 1 & 1 \\ 0 & 1 \end{pmatrix} \begin{pmatrix} P_i \\ P_j \end{pmatrix} \quad (15)$$

In this embodiment, with respect to six error patterns when the number of errors is "2", it may be necessary to provide (prepare) only two reception indexes ("2" and "3") to be fed back to the base station. Namely, when compared with a system where all the reception states (results) (ACK/NACK) of the packets are fed back (i.e., four bits are necessary), it may become possible to reduce the feed-back information amount in a system according to this embodiment.

(4-4) In a Case Where the Number of Errors (M) is "3"

In this case, as illustrated in FIGS. 5 and 6, a value "4" is fed back from the mobile station to the base station as the reception index R_IDX. Further, the base station selects an encoding matrix $G_{3,0}$ in response to the fed-back reception index, and generates three encoded packets. Those encoded packets are given in the following formula (16).

$$\begin{pmatrix} R_1 \\ R_2 \\ R_3 \end{pmatrix} = \begin{pmatrix} 1 & 1 & 1 & 1 \\ 1 & 0 & 1 & 0 \\ 1 & 0 & 0 & 1 \end{pmatrix} \begin{pmatrix} P_1 \\ P_2 \\ P_3 \\ P_4 \end{pmatrix} \quad (16)$$

Error Pattern "11" (NACK, NACK, NACK, ACK)

In a case of an error pattern "11", by cancelling (subtracting) one successfully received packet $P_4$ from the encoded packets transmitted from the base station, the encoded packets $R_1'$, $R_2'$, and $R_3'$ acquired after the cancel operation are given in the following formula (17). Further, as illustrated in the following formula (18), the determinant of the matrix in the right member of formula (17) is not "0". Therefore, according to the formula (17), the packets $P_1$, $P_2$, and $P_3$ may be reproduced (decoded).

$$\begin{pmatrix} R_1' \\ R_2' \\ R_3' \end{pmatrix} = \begin{pmatrix} 1 & 1 & 1 \\ 1 & 0 & 1 \\ 1 & 0 & 0 \end{pmatrix} \begin{pmatrix} P_1 \\ P_2 \\ P_3 \end{pmatrix} \quad (17)$$

$$\det \begin{pmatrix} 1 & 1 & 1 \\ 1 & 0 & 1 \\ 1 & 0 & 0 \end{pmatrix} = \det \begin{pmatrix} 0 & 1 & 0 \\ 0 & 0 & 1 \\ 1 & 0 & 0 \end{pmatrix} = 1 \quad (18)$$

Error Pattern "12" (NACK, NACK, ACK, NACK)

In a case of an error pattern "12", by cancelling (subtracting) one successfully received packet $P_3$ from the encoded packets transmitted from the base station, the encoded packets $R_1'$, $R_2'$, and $R_3'$ acquired after the cancel operation are given in the following formula (19). Further, as illustrated in the following formula (20), the determinant of the matrix in the right member of formula (19) is not "0". Therefore, according to the formula (19), the packets $P_1$, $P_2$, and $P_4$ may be reproduced (decoded).

$$\begin{pmatrix} R'_1 \\ R'_2 \\ R'_3 \end{pmatrix} = \begin{pmatrix} 1 & 1 & 1 \\ 1 & 0 & 0 \\ 1 & 0 & 1 \end{pmatrix} \begin{pmatrix} P_1 \\ P_2 \\ P_4 \end{pmatrix} \quad (19)$$

$$\det \begin{pmatrix} 1 & 1 & 1 \\ 1 & 0 & 0 \\ 1 & 0 & 1 \end{pmatrix} = \det \begin{pmatrix} 0 & 1 & 0 \\ 1 & 0 & 0 \\ 0 & 0 & 1 \end{pmatrix} = 1 \quad (20)$$

Error pattern "13" (NACK, ACK, NACK, NACK)

In a case of an error pattern "13", by cancelling (subtracting) one successfully received packet $P_2$ from the encoded packets transmitted from the base station, the encoded packets $R_1'$, $R_2'$, and $R_3'$ acquired after the cancel operation are given in the following formula (21). Further, as illustrated in the following formula (22), the determinant of the matrix in the right member of formula (21) is not "0". Therefore, according to the formula (21), the packets $P_1$, $P_3$, and $P_4$ may be reproduced (decoded).

$$\begin{pmatrix} R'_1 \\ R'_2 \\ R'_3 \end{pmatrix} = \begin{pmatrix} 1 & 1 & 1 \\ 1 & 1 & 0 \\ 1 & 0 & 1 \end{pmatrix} \begin{pmatrix} P_1 \\ P_3 \\ P_4 \end{pmatrix} \quad (21)$$

$$\det \begin{pmatrix} 1 & 1 & 1 \\ 1 & 1 & 0 \\ 1 & 0 & 1 \end{pmatrix} = \det \begin{pmatrix} 0 & 1 & 0 \\ 1 & 0 & 0 \\ 0 & 0 & 1 \end{pmatrix} = 1 \quad (22)$$

Error Pattern "14" (ACK, NACK, NACK, NACK)

In a case of an error pattern "14", by cancelling (subtracting) one successfully received packet $P_1$ from the encoded packets transmitted from the base station, the encoded packets $R_1'$, $R_2'$, and $R_3'$ acquired after the cancel operation are given in the following formula (23). Further, as illustrated in the following formula (24), the determinant of the matrix in the right member of formula (23) is not "0". Therefore, according to the formula (23), the packets $P_1$, $P_3$, and $P_4$ may be reproduced (decoded).

$$\begin{pmatrix} R'_1 \\ R'_2 \\ R'_3 \end{pmatrix} = \begin{pmatrix} 1 & 1 & 1 \\ 0 & 1 & 0 \\ 0 & 0 & 1 \end{pmatrix} \begin{pmatrix} P_2 \\ P_3 \\ P_4 \end{pmatrix} \quad (23)$$

$$\det \begin{pmatrix} 1 & 1 & 1 \\ 0 & 1 & 0 \\ 0 & 0 & 1 \end{pmatrix} = \det \begin{pmatrix} 1 & 0 & 0 \\ 0 & 1 & 0 \\ 0 & 0 & 1 \end{pmatrix} = 1 \quad (24)$$

In this embodiment, with respect to four error patterns when the number of errors is "3", it may be necessary to provide (prepare) only one reception index ("4") to be fed back to the base station. Namely, when compared with a system where all the reception states (results) (ACK/NACK) of the packets are fed back (i.e., four bits are necessary), it may become possible to reduce the feed-back information amount in a system according to this embodiment.

(4-5) In a Case Where the Number of Errors (M) is "4"

In this case, as illustrated in FIGS. 5 and 6, a value "5" is fed back from the mobile station to the base station as the reception index R_IDX. Further, the base station select an encoding matrix $G_{4,0}$ in response to the fed-back reception index.

The encoding matrix $G_{4,0}$ is a 4×4 unit matrix, which is (technically) equivalent to retransmitting all the four packets $P_1$ through $P_4$.

(5) Operation When Plural Packets are Transmitted from Base Station to Mobile Station Next, an operation when plural packets are transmitted from the base station to the mobile station is described with reference to FIG. 7. FIG. 7 is a flowchart illustrating an operation of transmitting plural packets from the base station to the mobile station. In the description, the elements illustrated in FIGS. 3 and 4 may be referred to.

First, N packets are transmitted from the base station to the mobile station (in step S10). In the mobile station, the error detector 35 performs error detection on each of the N packets (in step S12). The error detection results are output to the retransmission controller 37.

Based on the error detection results (ACK/NACK) of the packets, the retransmission controller 37 of the mobile station specifies the reception index R_IDX (step S14). Further, the error detection results (ACK/NACK) of the packets (i.e., error patterns) are associated with the corresponding reception indexes in the base station in advance.

The mobile station transmits the specified reception index to the base station (in step S16). In the retransmission controller 13 of the base station, the corresponding relationship between the reception indexes and the encoding methods (encoding matrixes) are defined in advance. Therefore, the retransmission controller 13 of the base station determines the encoding method based on the reception index transmitted in step S16 and performs the encoding (in step S18).

Specifically, the retransmission controller 13 multiplies the N transmission packets by the determined M×N (M: the number of errors) encoding matrix by the unit of bits, to generate M encoded packets. The M encoded packets are transmitted to the mobile station (in step S20).

The mobile station receives the M encoded packets. Further, the mobile station reproduces (replaces) the incorrectly received packets in step S12 by decoding the encoded packets (in step S22). Specifically, the packet decoder 34 of the mobile station reproduces the incorrectly received packets by cancelling (subtracting in a bit level) the successfully received packets in step S12 from the encoded packets. This decoding process is described by exemplifying the case where N=4.

(6) Method of Setting Encoding Matrix in Arbitrary Number of Packets

In the above (4), with respect to the encoding process and the decoding process of the packets in the retransmission, a case is specifically described where the number of packets to be transmitted is four. However, according to an embodiment, it may also be possible to appropriately set the encoding matrix with respect to an arbitrary number of packets to be transmitted. In the following, a method of setting an appropriate encoding matrix with respect to an arbitrary number of packets with a simple operation is described.

In this setting method, when assuming that the number of the packets to be transmitted is N, the encoding matrixes corresponding to the number of errors M (M: 1 to N−1) among N packets are calculated in the following steps.

Step A

With respect to a specific number of errors M, M×N encoding matrixes are generated in a manner such that the elements of the matrixes are determined by generating random number "0" or "1".

Step B

When assuming that M packets among N packets are incorrectly received, the number of error patterns is expressed by $_NC_M$. With respect to each of $_NC_M$ error patterns, it is determined whether the incorrectly received packets may be reproduced (decoded) from (by using) the encoded packets (retransmission packets) based on the encoding matrixes generated in step A.

Specifically, an M×M square matrix is generated, the M×M square matrix being a decomposed (degenerated) matrix having remaining M columns corresponding to coefficient columns to be multiplied with the incorrectly received packets in the encoding process. When the determinant of the decomposed (degenerated) matrix is other than zero, it may become possible to reproduce (decode) the incorrectly received packets based on the retransmission packets corresponding to the error pattern.

Step C

Among the $_NC_M$ error patterns, when there exist P incorrectly received packets which may not be reproduced in step B, a new encoding matrix is generated by generating the random numbers. By doing this, with respect to P incorrectly received packets, the error patterns are classified into a group of reproducible error patterns and a group of unreproducible error patterns.

Until all the incorrectly received packets may be reproduced for all the $_NC_M$ error patterns, the new encoding matrix is generated by generating the random numbers. Namely, until all the incorrectly received packets may be reproduced for all the $_NC_M$ error patterns, the number of the encoding matrixes may be increased.

By sequentially performing the processes of the above steps A to C with respect to the number of errors "M", the encoding matrixes corresponding to all the numbers of errors "M" may be acquired. In accordance with the setting method described above, in a case of N=8, the encoding matrixes as illustrated in FIGS. 8 and 9 may be acquired. FIG. 8 illustrates the encoding matrixes when the number of errors M among eight transmission packets is in a range from one to four, and FIG. 9 illustrates the encoding matrixes when the number of errors M among eight transmission packets is in a range from five to eight.

Further, it may also be possible to search for the encoding method to minimize the number of the encoding matrixes (i.e., the coding method to minimize the feed-back information amount) by performing the above steps, for example, 10,000,000 times by changing the random numbers. FIG. 10 illustrates a result of searching for the encoding method to minimize the feed-back information amount based on the above setting method when the number (N) of packets to be transmitted is in a range from 1 to 11.

In FIG. 10, for example, when assuming that N=11, the number of the encoding matrixes which may be necessary in the communication method according to this embodiment is 45. Further, the reception indexes are associated with the corresponding encoding matrixes. Therefore, the feed-back information amount (i.e., the number of bits that may express the reception indexes) may be six bits only.

On the other hand, as for a comparison, FIG. 10 also illustrates the feed-back information amount in a method of the related art for each of the reception states (ACK/NACK) (one bit) of plural packets. In this method of the related art, when N=11, 11 bits may be necessary. Therefore, according to this embodiment, it may become possible to greatly reduce the feed-back information amount.

As described above, in a communication system and a communication method according to this embodiment, the identification information (reception indexes) are previously associated with the corresponding combinations of the reception results (states) of plural packets in the mobile station, the plural packets being transmitted from the base station. The identification information is fed back to the base station.

Further, by paying attention to the fact that the successfully received packets in the initial transmission are known in the mobile station, the packets to be retransmitted from the base station are encoded (as the encoded packets) based on the encoding method so that the incorrectly received packets may be reproduced (decoded) based on the encoded packets and the successfully received packets by the mobile station in the initial transmission. The mobile station may reproduce (decode) the incorrectly received packets in the initial transmission by decoding the encoded packets using the successfully received packets in the initial transmission.

Here, as described above, when an appropriate encoding method is set, the number of the identification information items (reception information) (i.e., the number of encoding methods) may be reduced and be less than number of packets to be transmitted; therefore the feed-back information amount to the base station may be reduced.

According to an embodiment, a communication method of transmitting plural packets from a first communication device to a second communication device includes associating identification information items with combinations of reception results of the plural packets in the second communication device, a number of the identification information items being less than a number of the plural packets; transmitting, by the first communication device, the plural packets to the second communication device in initial transmission; specifying, by the second communication device, a first of the identification information items based on reception results of the plural packets in initial reception, and transmitting, by the second communication device, the first identification information item to the first communication device; determining, by the first communication device, an encoding method decodable by the second communication device with successfully received packets in the initial reception, encoding, by the first communication device, the plural packets based on the determined encoding method, and retransmitting, by the first communication device, the encoded packets to the second communication device; and decoding, by the second communication device, the encoded packets based on the successfully received packets in the initial reception, and reproducing, by the second communication device, incorrectly received packets in the initial reception.

According to another embodiment, a communication system includes a first communication device configured to transmit plural packets and a second communication device configured to receive the plural packets from the first communication device. Further the second communication device is configured to store identification information items associated with combinations of reception results of the plural packets in the second communication device, a number of the identification information items being less than a number of the plural packets. Further, the first communication device includes a first transmitter configured to initially transmit the plural packets to the second communication device, a first receiver configured to receive the identification information items from the second communication device, a packet encoder configured to determine an encoding method decodable by the second communication device with successfully received packets in the initial reception, encode the plural packets based on the determined encoding method to generate encoded packets, and a second transmitter configured to retransmit the encoded packets to the second communication device. Further, the second communication device includes a second receiver configured to initially receive the plural packets from the first communication device, an information specifying unit configured to specify a first identification information item based on the reception results of the plural packets, a third transmitter configured to transmit the first identification information item to the first communication device, a third receiver configured to receive the encoded packets from the first communication device, and a packet decoder configured to decode the encoded packets transmitted from the first communication device based on the successfully received packets in the initial reception to reproduce incorrectly received packets in the initial reception.

According to another embodiment, a transmission device transmitting plural packets to a receiving device includes a first transmitter configured to initially transmit the plural packets to the receiving device; a first receiver configured to receive identification information items from the receiving device, the identification information items being associated with combinations of reception results of the plural packets in the receiving device; a packet encoder configured to determine an encoding method decodable by the receiving device with successfully received packets in the initial reception of the plural packets, encode the plural packets based on the determined encoding method; and a second transmitter configured to retransmit the encoded packets to the receiving device.

According to another embodiment, a receiving device receiving plural packets from a transmission device and storing identification information items associated with combinations of reception results of the plural packets, includes a second receiver configured to initially receive the plural packets from the transmission device; an information specifying unit configured to specify a first of the identification information items based on reception results of the plural packets; a third transmitter configured to transmit the first identification information item to the transmission device; a third receiver configured to receive the encoded packets from the transmission device; and a packet decoder configured to decode the encoded packets transmitted from the transmission device based on the successfully received packets in initial reception to reproduce incorrectly received packets in the initial reception.

The communication method, the communication system, the transmission device, and the receiving device according to an embodiment described herein may reduce the amount of information to be fed back from the receiving-side transmission device to the transmitting-side communication device in relation to the success or failure of receiving the plural packets.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiment of the present invention has been described in detail, it should be understood that various changes, substitutions, and alterations could be made hereto without departing from the sprit and scope of the invention.

What is claimed is:

1. A communication method of transmitting a plurality of packets from a first communication device to a second communication device, the communication method comprising:
    associating identification information items with combinations of reception results of the plurality of packets in the second communication device, a number of the identification information items being less than a number of the plurality of packets;
    transmitting, by the first communication device, the plurality of packets to the second communication device in an initial transmission;
    specifying, by the second communication device, a first of the identification information items based on reception results of the plurality of packets in an initial reception, and transmitting, by the second communication device, the first identification information item to the first communication device;
    retransmitting, by the first communication device, encoded packets to the second communication device by determining an encoding method decodable by the second communication device from successfully received packets in the initial reception, and encoding the plurality of packets based on the determined encoding method to obtain the encoded packets, in order to retransmit the encoded packets to the second communication device; and
    decoding, by the second communication device, the encoded packets based on the successfully received packets in the initial reception, and reproducing, by the second communication device, incorrectly received packets in the initial reception,
    wherein a plurality of error patterns Ai are provided with respect to a number of errors, Ei, and the first identification information item with respect to the number of errors, Ei, corresponds to error patterns Bi of the plurality of error patterns Ai with respect to the number of errors, Ei, where Ai, Bi, Ei, and i are integers satisfying Ai>Bi>1, Ei>=0, and i>=1.

2. The communication method according to claim 1, wherein
    a bit sequence of M encoded packets is represented by an M×N first matrix with respect to a bit sequence of N packets, where N denotes a number of the plurality of packets and is an integer greater than one, and M denotes a number of the incorrectly received packets in the initial reception of the second communication device amongst the N packets, and
    the first matrix, when decomposed into an M×M second matrix, includes an inverse matrix in the second matrix.

3. A communication method of transmitting a plurality of packets from a first communication device to a second communication device, the communication method comprising:
    associating identification information items with combinations of reception results of the plurality of packets in the second communication device, a number of the identification information items being less than a number of the plurality of packets;
    transmitting, by the first communication device, the plurality of packets to the second communication device in an initial transmission;
    specifying, by the second communication device, a first of the identification information items based on reception results of the plurality of packets in an initial reception, and transmitting, by the second communication device, the first identification information item to the first communication device;

retransmitting, by the first communication device, encoded packets to the second communication device by determining an encoding method decodable by the second communication device from successfully received packets in the initial reception, and encoding the plurality of packets based on the determined encoding method to obtain the encoded packets, in order to retransmit the encoded packets to the second communication device; and decoding, by the second communication device, the encoded packets based on the successfully received packets in the initial reception, and reproducing, by the second communication device, incorrectly received packets in the initial reception, wherein a number of the encoded packets is the same as a number of the incorrectly received packets in the initial reception of the second communication device, and wherein, in the retransmitting, the first communication device generates a single encoded packet from a single packet amongst the plurality of packets or by adding two or more packets in units of bits, and generates the encoded packets so that each of the plurality of packets becomes one of the encoded packets or each of the plurality of packets becomes a target to be added when generating the one of the encoded packets.

4. The communication method according to claim 3, wherein in the decoding and the reproducing by the second communication device, the second communication device decodes the encoded packets by subtracting the successfully received packets in the initial reception from the encoded packets in the units of bits.

5. A communication system comprising:

a first communication device configured to transmit a plurality of packets; and a second communication device configured to receive the plurality of packets from the first communication device;

wherein the second communication device stores identification information items associated with combinations of reception results of the plurality of packets in the second communication device, a number of the identification information items being less than a number of the plurality of packets, wherein the first communication device includes
  a first transmitter configured to transmit the plurality of packets to the second communication device in an initial transmission,
  a first receiver configured to receive the identification information from the second communication device,
  a packet encoder configured to determine an encoding method decodable by the second communication device from successfully received packets in an initial reception, and encode the plurality of packets based on the determined encoding method to generate encoded packets, and
  a second transmitter configured to retransmit the encoded packets to the second communication device, wherein the second communication device includes
  a second receiver configured to receive the plurality of packets from the first communication device in the initial reception,
  an information specifying unit configured to specify a first of the identification information items based on the reception results of the plurality of packets,
  a third transmitter configured to transmit the first identification information item to the first communication device,
  a third receiver configured to receive the encoded packets from the first communication device, and
  a packet decoder configured to decode the encoded packets transmitted from the first communication device based on the successfully received packets in the initial reception to reproduce incorrectly received packets in the initial reception, wherein a plurality of error patterns Ai are provided with respect to a number of errors, Ei, and the first identification information item with respect to the number of errors, Ei, corresponds to error patterns Bi of the plurality of error patterns Ai with respect to the number of errors, Ei, where Ai, Bi, Ei, and i are integers satisfying Ai>Bi >1, Ei>=0, and i>=1.

6. The communication system according to claim 5, wherein
  a bit sequence of M encoded packets is represented by an M×N first matrix with respect to a bit sequence of N packets, where N denotes a number of the plurality of packets and is an integer greater than one, and M denotes a number of the incorrectly received packets in the initial reception of the second communication device amongst the N packets, and
  wherein the first matrix, when decomposed into an M×M second matrix, includes an inverse matrix in the second matrix.

7. A communication method comprising:

a first communication device configured to transmit a plurality of packets; and a second communication device configured to receive the plurality of packets from the first communication device;

wherein the second communication device stores identification information items associated with combinations of reception results of the plurality of packets in the second communication device, a number of the identification information items being less than a number of the plurality of packets, wherein the first communication device includes
  a first transmitter configured to transmit the plurality of packets to the second communication device in an initial transmission,
  a first receiver configured to receive the identification information from the second communication device,
  a packet encoder configured to determine an encoding method decodable by the second communication device from successfully received packets in an initial reception, and encode the plurality of packets based on the determined encoding method to generate encoded packets, and
  a second transmitter configured to retransmit the encoded packets to the second communication device, wherein the second communication device includes
  a second receiver configured to receive the plurality of packets from the first communication device in the initial reception,
  an information specifying unit configured to specify a first of the identification information items based on the reception results of the plurality of packets,
  a third transmitter configured to transmit the first identification information item to the first communication device, a third receiver configured to receive the encoded packets from the first communication device, and a packet decoder configured to decode the encoded packets transmitted from the first communication device based on the successfully received packets in the initial reception to reproduce incorrectly received packets in the initial reception, wherein a number of the encoded packets is the same as a number of the incorrectly received packets in the initial reception of the second communication device, and wherein the packet encoder generates a single encoded packet based on a single packet amongst the plurality of packets or by adding two or more packets in units of bits, and generates the encoded packets so that each of the plurality of packets becomes one of the encoded packets or each of the plurality of packets becomes a target to be added when generating the one of the encoded packets.

8. The communication method according to claim 7, wherein the packet decoder decodes the encoded packets by subtracting the successfully received packets in the initial reception from the encoded packets in the units of bits.

9. The communication method according to claim 7, wherein
a bit sequence of M encoded packets is represented by an M×N first matrix with respect to a bit sequence of N packets, where N denotes a number of the plurality of packets and is an integer greater than one, and M denotes a number of the incorrectly received packets in the initial reception of the second communication device amongst the N packets, and
the first matrix, when decomposed into an M×M second matrix, includes an inverse matrix in the second matrix.

10. A transmission device to transmit a plurality of packets to a receiving device, comprising:
a first transmitter configured to transmit a plurality of packets to the receiving device in an initial transmission;
a first receiver configured to receive identification information items from the receiving device, the identification information items being associated with combinations of reception results of the plurality of packets in the receiving device;
a packet encoder configured to determine an encoding method decodable by the receiving device from successfully received packets in an initial reception of the plurality of packets, and encode the plurality of packets based on the determined encoding method; and
a second transmitter configured to retransmit the encoded packets to the receiving device,
wherein a plurality of error patterns Ai are provided with respect to a number of errors, Ei, and the first identification information item with respect to the number of errors, Ei, corresponds to error patterns Bi of the plurality of error patterns Ai with respect to the number of errors, Ei, where Ai, Bi, Ei, and i are integers satisfying Ai>Bi>1, Ei>=0, and i>=1.

11. The transmission device according to claim 10, wherein
a bit sequence of M encoded packets is represented by an M×N first matrix with respect to a bit sequence of N packets, where N denotes a number of the plurality of packets and is an integer greater than one, and M denotes a number of incorrectly received packets in the initial reception of the receiving device amongst the N packets, and
wherein the first matrix, when decomposed into an M×M second matrix, includes an inverse matrix in the second matrix.

12. A receiving device to receive a plurality of packets from a transmission device and store identification information items associated with combinations of reception results of the plurality of packets, the receiving device comprising:
a first receiver configured to receive the plurality of packets from the transmission device in an initial reception;
an information specifying unit configured to specify a first of the identification information items based on reception results of the plurality of packets;
a transmitter configured to transmit the first identification information item to the transmission device;
a second receiver configured to receive the encoded packets from the transmission device; and
a packet decoder configured to decode the encoded packets transmitted from the transmission device based on successfully received packets in the initial reception to reproduce incorrectly received packets in the initial reception,
wherein a plurality of error patterns Ai are provided with respect to a number of errors, Ei, and the first identification information item with respect to the number of errors, Ei, corresponds to error patterns Bi of the plurality of error patterns Ai with respect to the number of errors, Ei, where Ai, Bi, Ei, and i are integers satisfying Ai>Bi>1, Ei>=0, and i>=1.

13. The receiving device according to claim 12, wherein
a bit sequence of M encoded packets is represented by an M×N first matrix with respect to a bit sequence of N packets, where N denotes a number of the plurality of packets and is an integer greater than one, and M denotes a number of the incorrectly received packets in the initial reception amongst the N packets, and
wherein the first matrix, when decomposed into an M×M second matrix, includes an inverse matrix in the second matrix.

* * * * *